United States Patent

[11] 3,547,348

| [72] | Inventor | Andrew P. Kruper<br>Pittsburgh, Pa. |
|---|---|---|
| [21] | Appl. No. | 801,064 |
| [22] | Filed | Feb. 20, 1969 |
| [45] | Patented | Dec. 15, 1970 |
| [73] | Assignee | Westinghouse Electric Corporation<br>Pittsburgh, Pa.<br>a corporation of Pennsylvania |

[54] HUMIDITY CONTROL SYSTEM
9 Claims, 2 Drawing Figs.

[52] U.S. Cl. .................................................. 236/44;
165/21; 307/242; 340/235
[51] Int. Cl. .................................................. F24f 3/14
[50] Field of Search ...................................... 236/44,
44E, 44C; 165/21, 20; 307/242, 252, 290; 328/4;
340/235; 62/180; 34/46

[56] References Cited
UNITED STATES PATENTS

| 3,328,606 | 6/1967 | Pinckaers ............... | 307/305 |
| 3,331,139 | 7/1967 | Finnegan et al. ....... | 34/45 |
| 3,386,498 | 6/1968 | Funfstuck ............... | 307/310X |

OTHER REFERENCES
Electrical Design News, vol. 9, no. 7, June 1964, p. 115

Primary Examiner—William E. Wayner
Attorney—F. H. Henson

ABSTRACT: A single humidity sensor controls through one solid-state circuit, an air dehumidifier, and controls through another solid-state circuit, an air humidifier.

INVENTOR:
ANDREW P. KRUPER,
BY Robert J. Palmer
ATTORNEY

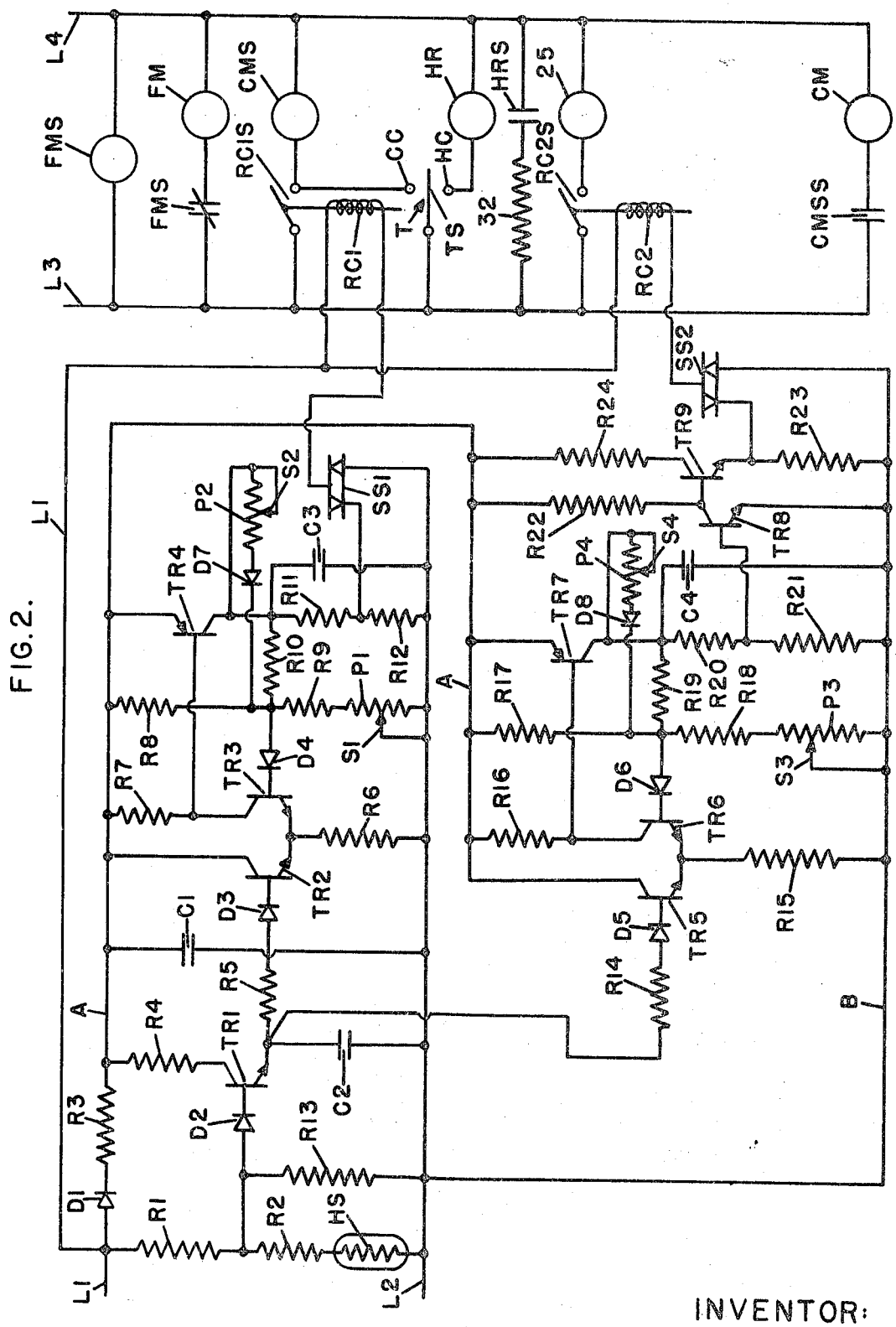

HUMIDITY CONTROL SYSTEM

BACKGROUND OF THE INVENTION

In computer rooms, as in manufacturing "clean" rooms, it is required that temperature and relative humidity be maintained at substantially constant levels. The available humidity controls have the defects of being relatively expensive; they do not provide positive on-off action at the control points, resulting in chatter; they have no adjustments for the differentials between the turn-on, and turn-off points; they usually have sensitive relays which are used to actuate control relays, and where it has been desired to independently set the control points for dehumidifying and for humidifying, it has been necessary to use two separate control circuits, each with its independent humidity sensor.

SUMMARY OF THE INVENTION

An AC operated humidity sensor controls through an AC operated, solid-state circuit, a bidirectional solid-state switch which energizes a relay to turn on the dehumidifier of an air conditioning unit when the relative humidity of the air served by the unit is above a desired level, and which deenergizes the relay when the relative humidity decreases to that level or below that level depending on the differential setting, and controls through another AC operated, solid-state circuit, another bidirectional solid-state switch which energizes another relay to turn on the humidifier of the air-conditioning unit when the relative humidity of the air is below the desired level, and which deenergizes the other relay when the relative humidity increases to that level, or to some higher level.

BRIEF DESCRIPTION OF THE DRAWINGS

FIG. 2 is a schematic of a control circuit embodying this invention, showing solid-state circuits and components for controlling the operation of the air-conditioning system of FIG. 1.

DESCRIPTION OF THE PREFERRED EMBODIMENT

Figure 1:
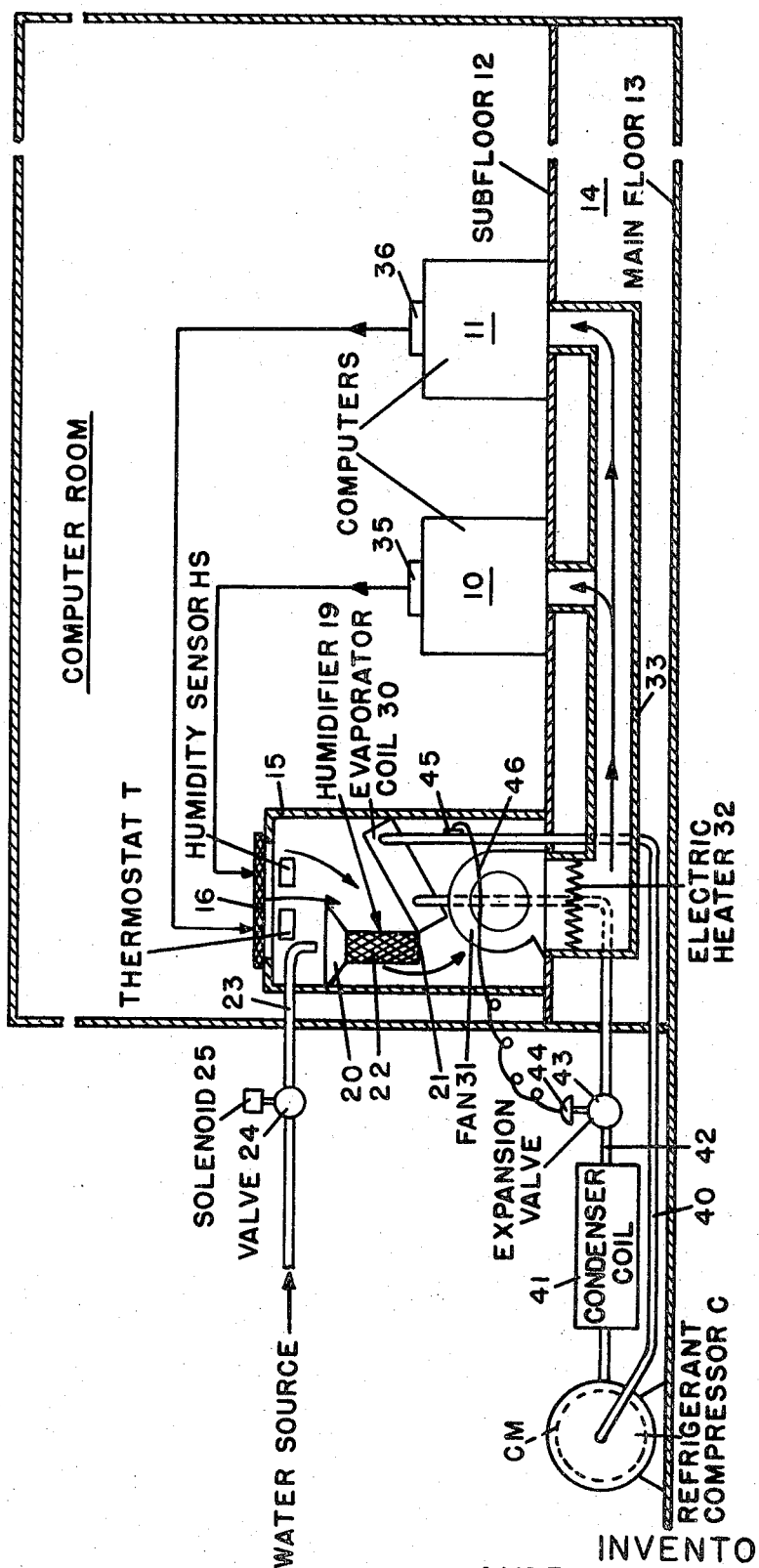
FIG. 1 is a diagrammatic view of an air-conditioning system controlled by the circuit of FIG. 2, for supplying conditioned air to computers within a computer room, the walls and floors of the room being in section, an air-conditioning unit within the room being in section, and a duct connecting the unit to the computers being in section.

Referring first to FIG. 1 of the drawings, a computer room contains computers 10 and 11 supported on a subfloor 12 above and spaced from a main floor 13, space 14 between the floors 12 and 13 being provided for receiving a duct and cables etc. Within the computer room there is also an air-conditioning unit 15 having an air inlet 16 in its top. Below the inlet 16 there are supported a humidity sensor HS and a thermostat T. Below the sensor HS and the thermostat T is a humidifier 19 having a funnel-shaped upper portion 20 contacting one side of the unit 15, and having a lower portion 22 of wire screen around water absorbing material (not shown) such as felt or plastic wool sprayed with cotton batting. Above the upper portion 20 of the humidifier 19 is a water tube 23 arranged to supply water into the humidifier 19. The tube is connected to a conventional source of water under pressure (not shown), and contains a valve 24 opened and closed by a solenoid 25.

An evaporator coil 30 extends from the opposite side of the unit 15 against the bottom of the humidifier 19. The coil 30 and the humidifier 19 extend across the interior of the unit 15 so that air passing through the latter passes partially through the coil 30, and partially through the screen lower portion 22 of the humidifier 19.

Below the coil 30 and the humidifier 19 is a centrifugal fan 31 driven by an electric motor FM (not shown). Connected to the outlet of the fan 31 through an opening in the bottom of the unit 15, is a duct 33 which extends within the space 14, and connects with air inlets in the bottoms of the computers 10 and 11. An electric heater resistor 32 extends across the air inlet portion of the duct 33. The tops of the computers 10 and 11 have air outlets 35 and 36 respectively.

The evaporator coil 30 is connected by suction gas tube 40 to the inlet of compressor C, driven by enclosed, electric motor CM. The outlet of the compressor C is connected to condenser coil 41 which is connected through tube 43 and expansion valve 43 to the evaporator coil 30. The valve 43 has a diaphragm chamber 44 connected by capillary tube 46 to thermal bulb 45 in contact with the suction gas tube adjacent to where the latter is connected to the coil 30, so as to respond to superheat in the suction gas from the coil 30.

Referring now to FIG. 2 of the drawings, the humidity sensor HS is connected to 24 volt, AC supply line L2, and in series with resistors R1 and R2 to 24 volt, AC supply line L1. The line L1 is connected through diode D1 and resistor R3 to DC bus A. A filter capacitor C1 is connected to the bus A and to the line L2. The junction of the resistors R1 and R2 is connected through diode D2 to the base of NPN transistor TR1. The collector of the latter is connected through resistor R4 to the bus A, and its emitter is connected through capacitor C2 to the line L2, and is connected through resistor R5 to diode D3 which is connected to the base of NPN transistor TR2. The collector of the latter is connected to the bus A, and its emitter is connected through resistor R6 to the line L2, and is connected to the emitter of NPN transistor TR 3. The collector of the latter is connected through resistor R7 to the bus A, and its base is connected through diode D4 to the junction of series-connected resistors R8 and R9. The resistor R8 is connected to the bus A. The resistor R9 is connected in series with level-set potentiometer P1 to the line L2. The potentiometer P1 has a slider S1 connected to the line L2. The collector of the transistor TR3 is also connected to the base of PNP transistor TR4, the emitter of which is connected to the bus A, and the collector of which is connected through resistor R10 to the junction of the resistors R8 and R9. The collector of the transistor TR4 is also connected through series-connected resistors R11 and R12 to the line L2. A capacitor C3 is connected across the resistors R11 and R12. A differential adjust potentiometer P2 is connected through diode D7 to the junction of the resistors R9 and R8, and to the collector of the transistor TR4. The potentiometer P2 has a slider S2 connected to the collector of the transistor TR4. The junction of the resistors R11 and R12 is connected to the gate of Triac SS1, a solid-state, bidirectional switch. The Triac SS1 is connected to the line L2, and its output is connected through output relay coil RC1 to the line L1. The coil RC1 has a switch RC1S which closes when the coil RC1 is energized, and which connects starter CMS of the compressor motor CM to AC main supply lines L3 and L4. The junction of the resistors R1 and R2 is also connected through resistor R13 to the line L2. The circuit described so far in connection with FIG. 2 is for controlling dehumidifying as will be described later.

The resistors R1 and R2, and the humidity sensor HS form a voltage divider across the lines L1 and L2. On the positive half cycles, the peak voltage across the sensor HS charges through the diode D2 and the transistor TR1, the capacitor C2. Charging current for the latter is supplied by the emitter-collector circuit of the transistor TR1, and the only loading on the sensor HS is that required to supply base current to the transistor TR1. The use of the latter greatly reduces such loading over that which would result if the capacitor C2 was charged directly by the diode D2. The resultant DC voltage on the capacitor C2 (which is directly proportional to the AC voltage across the sensor HS) serves as a DC input level to the differential transistor pair TR2 and TR3. When the transistor TR2 conducts, it causes the transistor TR3 to be backwardly biased so that it cannot conduct. When the transistor TR2 is turned off, the transistor TR3 is forwardly biased, and conducts. The output of the transistor pair TR2—TR3 is taken from the collector of the transistor TR3, and controls the transistor TR4. There is adjustable positive feedback from the collector of the transistor TR4 through the potentiometer P2 and the diodes D4 and D7 to the base of the transistor TR3 to provide on-off snap action, and to permit adjustment of the differential between on and off. The transistor TR4 provides gate drive to the output switch SS1 which energizes the relay coil RC1 from the 24 volt AC supply.

Increasing relative humidity results in the resistance of the humidity sensor HS decreasing, reducing the voltage on the capacitor C2, turning the transistor TR2 off, allowing the transistor TR3 to become forwardly biased so that it is turned on, and turns the transistor TR4 on. The latter turns the switch SS1 on. When the transistor TR4 is turned on, it raises the voltage on the base of the transistor TR3, providing the previously described positive feedback.

Decreasing relative humidity results in an increase in the resistance of the humidity sensor HS, increasing the voltage on the capacitor C2, turning the transistor TR2 on, and turning the transistors TR3 and TR4, and the output switch SS1 off.

The diode D1 and the capacitor C1 provide a rectified, halfwave DC supply for the control circuit. The latter is self-compensating for changes in line voltage since an increase in-line voltage which increases the voltage across the sensor HS, and the DC level on the capacitor C2, also increases the reference voltage on the transistor TR3.

The humidity sensor HS is a conventional one which may consist of a hygroscopic coating of lithium chloride or lithium bromide on a tubular support form with bifilar grids, or on a flat plate with interdigitated grids, such as model 15—1215 manufactured by Hygrodynamics, Inc. of Silver Springs, Maryland.

For controlling humidification, the circuit described in the following is used. The line L2 is connected to the bus B. The emitter of the transistor TR1 is also connected through resistor R14 and diode D5 to the base of NPN transistor TR5, the collector of which is connected to the bus A, and the emitter of which is connected to the emitter of NPN transistor TR6, and through resistor R15 to the bus B. The collector of the transistor TR6 is connected through resistor R16 to the bus A, and to the base of PNP transistor TR7. The base of the transistor TR6 is connected through diode D6 to the junction of series-connected resistors R17 and R18, the resistor R17 being connected to the bus A, and the resistor R18 being connected in series with potentiometer P3 to the bus B. Slider S3 of the potentiometer P3 is connected to the bus B. The emitter of the transistor TR7 is connected to the bus A. The junction of the resistors R17 and R18 is also connected through resistor R19 to the collector of the transistor TR7, and through series-connected resistors R20 and R21 to the bus B. A capacitor C4 is connected across the resistors R20 and R21. A potentiometer P4 is connected to the collector of the transistor TR7, and through diode D8 to the diode D6. Slider S4 of the potentiometer P4 is connected to the collector of the transistor TR7. The junction of the resistors R20 and R21 is also connected to the base of NPN transistor TR9, the collector of which is connected through resistor R22 to the bus A, and the emitter of which is connected to the bus B. The collector of the transistor TR8 is connected to the base of NPN transistor TR9, the emitter of which is connected through resistor R23 to the bus B, and is connected to the gate of Triac SS2, which is connected to the bus B, and the output of which is connected through relay coil RC2 to the line L1. The collector of the transistor TR9 is connected through resistor R24 to the bus A. The coil RC2 has a switch RC2S which closes when the coil RC2 is energized, and which connects the valve solenoid 25 to the main supply lines L3 and L4.

The transistor TR5 senses the DC voltage on the capacitor C2, but has its own reference level set potentiometer P3, and differential adjust potentiometer P4. The DC voltage on the capacitor C2 serves as a DC input level to the differential transistor pair TR5 and TR6. When the transistor TR5 conducts, it causes the transistor TR6 to become backwardly biased so that it cannot conduct. When the transistor TR5 is turned off, the transistor TR6 conducts since it is forwardly biased. The output of the transistor pair TR5-TR6 is taken from the collector of the transistor TR6, and controls the transistor TR7. There is positive feedback from the collector of the transistor TR7 to the base of the transistor TR6 through the potentiometer P4 and the diodes D6 and D8 to provide on-off snap action, and to permit adjustment of the differential between on and off. Since it is desired to energize the relay coil RC2 when a decrease in the humidity occurs (increase in the resistance of the humidity sensor HS), a sense inversion is provided by the transistors TR8 and TR9. Decreasing relative humidity below the desired level results in an increase in the resistance of the humidity sensor HS, increasing the DC voltage on the capacitor C2, increasing the bias on the transistor TR5, causing it to conduct, causing the transistor TR6 to become backwardly biased so that it is turned off, and turns off the transistor TR7. When the latter is turned off, it turns off the transistor TR8, and base current is supplied to the transistor TR9 through the resistor R22. The transistor TR9 conducts and supplies gate current to the switch SS2, turning the latter on, and energizing the relay coil RC2.

An increase in relative humidity to the desired level results in the resistance of the humidity sensor HS decreasing, reducing the bias on the transistor TR1, reducing the DC voltage on the capacitor C2, decreasing the bias on the transistor TR5, turning it off, causing the transistor TR6 to become forwardly biased and to turn on, and to turn on the transistor TR7. When the latter is turned on, the transistor TR8 is turned on, connecting the base of the transistor TR9 to the bus B, preventing the transistor TR9 from conducting and supplying gate current to the output switch SS2, preventing the latter from conducting, and deenergizing the relay coil RC2.

The fan motor FM has a starter FMS connected directly to the main supply lines L3 and L4 so that its switch FMSS is continuously closed, and continuously energizes the fan motor FM from the lines L3 and L4. The thermostat T has a switch TS connected to the line L3; has a cooling switch contact CC, and has a heating switch contact HC. The contact CC is connected to one side of starter CMS of the compressor motor CM. The other side of the starter CMS is connected to the line L4. The switch RC1S of the coil RC1 is connected to the line L3, and, when closed, is connected to one side of the compressor motor starter CMS. The contact HC is connected to one side of heat relay HR, the other side of which is connected to the line L4. The electric heater resistor 32 is connected in series with switch HRS of the relay HR to the lines L3 and L4. The compressor motor CM is connected in series with switch CMSS of its starter CMS to the lines L3 and L4.

OPERATION

It is desired, for example, to maintain a relative humidity of 45 percent, and a drybulb temperature of 70° F. within the computer room. The fan 31 within the air-conditioning unit 15 operates continuously, continuously recirculating air through the unit 15 and the computers 10 and 11. When the relative humidity of the air increases above 45 percent as it may on a summer day when the wet bulb temperature is relatively high, the resistance of the humidity sensor HS decreases, reducing the bias on the transistor TR1, and its conduction, reducing the DC voltage on the capacitor C2, and the bias on the transistor TR2, turning the latter off. This permits the transistor TR3 to become forward biased aNd to conduct, turning the transistor TR4 on. The latter turns on the switch SS1 which conducts and energizes the relay coil RC1. The switch RC1S of the latter closes and energizes the compressor motor starter CMS which closes its switch CMSS, starting the compressor motor CM. Discharge gas flows from the compressor C into the condenser coil 41. Liquid flows from the coil 41 into the expansion valve 43 where it is expanded and then supplied into the evaporator coil 30. Gas flows from the coil 30 to the suction side of the compressor C. The evaporator coil 30 chills the air passing over its surface to a dew point temperature which may be 55° F., condensing excess moisture from the air. The thermostat TS moves against the contact HC turning the heat relay HR on. The latter closes its switch HRS, turning the electric heater resistor 32 on to reheat the dehumidified air. When the temperature of the air increases to 70° F., the thermostat switch TS moves from the contact HC, deenergizing the heat relay HR and the heater resistor 32.

When the relative humidity decreases to 45 percent, the resistance of the humidity sensor HS increases, increasing the bias on the transistor TR1, increasing the DC voltage on the capacitor C2, increasing the bias on the transistor TR2 causing it to conduct and to cause the transistor TR3 to become backward biased and to turn off. The transistor TR4 then turns off and turns the output switch SS1 off, deenergizing the output relay coil RC1, which opens its switch RC1S, turning the compressor starter CMS off, and the compressor motor CM off.

When the relative humidity decreases below 45 percent, the resistance of the humidity sensor HS increases, increasing the bias on the transistor TR1, and the DC voltage level on the capacitor C2, increasing the bias on the transistor TR6, causing it to conduct and to cause the transistor TR6 to become backward biased and to turn off, and to turn off the transistor TR7. When the latter turns off, it turns the transistor TR8 off, and base current is supplied to the transistor TR9 through the resistor R22, causing the transistor TR9 to conduct and to supply gate current to the output switch SS2, turning it on, and turning the relay coil CR2 on. The latter closes its switch CR2S, turning the solenoid 25 on. The latter opens the valve 24, supplying water into the humidifier 19. The latter adds moisture to the air passing through it.

When the air has been sufficiently humidified for its relative humidity to increase to 45 percent, the resistance of the sensor HS decreases, reducing the bias on the transistor TR1, reducing the DC voltage on the capacitor C2, decreasing the bias on the transistor TR5, turning it off and causing the transistor TR6 to become forwardly biased, turning it on, turning on the transistor TR7. When the latter is turned on, it turns on the transistor TR8, connecting the base of the transistor TR9 to the bus B, preventing the transistor TR9 from conducting and supplying gate current to the output switch SS2, preventing the latter from conducting. The relay coil RC2 is deenergized, and its switch RC2S opens and turns off the solenoid which closes the valve 24.

The thermostat T would also cycle the compressor C to provide air cooling as distinguished from air dehumidifying, and to cycle the heater resistor 32 to provide air heating as distinguished from air reheating.

The humidification control circuit adds negligible loading on the capacitor C2, and there is no significant interaction between the dehumidification control and the humidification control circuits.

Among the advantages of this invention are that the overall control circuit is self compensating for line voltage regulation; two independent control circuits use a common humidity sensor; each control circuit has its own set point adjustment and differential adjustment; the humidity sensor is excited by AC so that there is no polarization which would result if it was excited by DC and bidirectional, solid state, output switches are used to supply AC to the output relays.

I claim:
1. A system for controlling the relative humidity of air within a space, comprising:
a dehumidifier for decreasing the relative humidity of said air;
a humidifier for increasing the relative humidity of said air;
first control means for said dehumidifier;
second control means for said humidifier;
a sensor responsive to the relative humidity of said air, said sensor having an electrical resistance which decreases with increases in relative humidity, and vice versa;
a pair of AC supply lines;
electrical resistor means;
said sensor and said resistor means being connected in series to said lines;
a first, AC bidirectional, solid-state switch connected to said lines and to said first control means, said switch having a gate;
a second, AC bidirectional, solid-state switch connected to said lines and to said second control means, said second switch having a second gate;
means connected to the junction of said sensor and said resistor means for supplying control voltages corresponding to variations in the resistance of said sensor;
means responsive to said control voltages for supplying gate current to said gate of said first switch when the relative humidity of said air increases above a predetermined level; and
means responsive to said control voltages for supplying gate current to said second gate when the relative humidity of said air decreases below said level.

2. A system as claimed in claim 1 in which said means connected to said junction, comprises:
rectifier means connected to one of said lines for changing AC to half-wave DC
a transistor having its input connected to said junction, and its output connected to the output of said rectifier means; and
a capacitor connected to said output of said transistor and to the other one of said lines.

3. A system as claimed in claim 1 in which said system includes:
rectifier means connected to one of said lines for changing AC to half-wave DC
a DC bus connected to the output of said rectifier means;
and in which said means connected to said junction comprises:
an NPN transistor having its collector connected to said bus;
a diode connected to said junction and to the base of said transistor, said diode being poled to pass positive half-waves of the AC at said junction to said base; and
a capacitor connected to the emitter of said transistor and to the other one of said lines.

4. A system as claimed in claim 3 in which:
said means for supplying gate current to said gate of said first switch, comprises:
a second NPN transistor having its collector connected to said bus, and its emitter connected to said other line;
a second diode connected to said capacitor and to the base of said second transistor, said second diode being poled to pass DC voltage variations from said capacitor to said base of said second transistor; and
in which said means for supplying gate current to said second gate, comprises:
a third NPN transistor having its collector connected to said bus, and its emitter connected to said other line; and
a third diode connected to said capacitor and to the base of said third transistor, said third diode being poled to pass DC voltage variations from said capacitor to said base of said third transistor.

5. A system as claimed in claim 4 in which:
said means for supplying gate current to said gate of said first switch, comprises:
a fourth NPN transistor having its emitter connected to said emitter of said second transistor, and having its collector connected to said bus; and
in which said means for supplying gate current to said second gate, comprises:
a fifth NPN transistor having its emitter connected to said emitter of said third transistor, and having its collector connected to said bus.

6. A system as claimed in claim 5 in which:
said means for supplying gate current to said gate of said first switch, comprises:
a first PNP transistor having its base connected to said collector of said fourth transistor, having its emitter connected to said bus, and having its collector connected to said other line and to said gate of said first switch;

a fourth diode connected to said bus and to said other line and to said base of said fourth transistor, said diode being poled to pass positive half-waves to said base of said fourth transistor;

in which said means for supplying gate current to said second gate, comprises:

a second PNP transistor having its base connected to said collector of said fifth transistor, having its emitter connected to said bus, and having its collector connected to said other line; and a fifth diode connected to said bus and to said other line and to said base of said fifth transistor, said diode being poled to pass positive half-waves to said base of said fifth transistor.

7. A system as claimed in claim 6 in which: a sixth NPN transistor has its base connected to said collector of said second PNP transistor, has its emitter connected to said other line, and has its collector connected to said bus.

8. A system as claimed in claim 7 in which: a seventh NPN transistor has its base connected to said collector of said sixth transistor, has its collector connected to said bus, and has its emitter connected to said other line and to said second gate.

9. A system as claimed in claim 8 in which:

said fourth diode is connected to said other line through variable resistor means, and to said collector of said first PNP transistor through variable resistor means; and in which said fifth diode is connected through variable resistor means to said other line, and to said collector of said second PNP transistor through variable resistor means.